(12) United States Patent
Johnson

(10) Patent No.: US 6,613,404 B2
(45) Date of Patent: Sep. 2, 2003

(54) SUPPRESSING HEAT FLUX IN INSULATING GLASS STRUCTURES

(76) Inventor: Terry S. Johnson, 2247 Meadowgreen Cir., Franktown, CO (US) 80116

( * ) Notice: Subject to any disclaimer, the term of this patent is extended or adjusted under 35 U.S.C. 154(b) by 0 days.

(21) Appl. No.: 10/157,313

(22) Filed: May 28, 2002

(65) Prior Publication Data

US 2003/0064176 A1 Apr. 3, 2003

Related U.S. Application Data

(60) Provisional application No. 60/294,498, filed on May 29, 2001.

(51) Int. Cl.[7] .............. E06B 3/24; C03C 27/00; F24J 2/34
(52) U.S. Cl. .............. 428/34; 428/913; 52/786.13; 165/49; 126/618; 126/619; 156/109
(58) Field of Search ............. 52/786.13, 786.1; 126/618, 619, 623, 633, 910; 156/107, 109; 165/48.1, 48.2, 49; 296/84.1, 96.14; 428/34, 414, 417, 192, 426, 429, 913

(56) References Cited

U.S. PATENT DOCUMENTS

| | | | |
|---|---|---|---|
| 2,595,905 A | 5/1952 | Telkes | |
| 3,807,791 A | 4/1974 | Boyer | |
| 4,155,205 A | 5/1979 | Polman | |
| 4,412,528 A | 11/1983 | Elzinga, Jr. | |
| 4,421,101 A | 12/1983 | Stice | |
| 4,446,850 A | * 5/1984 | Zilisch | 126/431 |
| 4,498,459 A | * 2/1985 | Korin et al. | 126/430 |
| 4,532,917 A | 8/1985 | Taff et al. | |
| 4,572,864 A | * 2/1986 | Benson et al. | 428/403 |
| 4,739,748 A | 4/1988 | Stice | |
| 5,087,489 A | 2/1992 | Lingemann | |
| 6,001,487 A | 12/1999 | Ladang et al. | |
| 6,066,372 A | 5/2000 | Miles | |

FOREIGN PATENT DOCUMENTS

| | | |
|---|---|---|
| DE | 4024143 | 2/1992 |
| DE | 19744423 | 4/1998 |

* cited by examiner

Primary Examiner—Donald J. Loney
(74) Attorney, Agent, or Firm—Kyle W. Rost

(57) ABSTRACT

Inner (32) and outer (34) juxtaposed glazed panes are separated from each other by an interlayer containing a gas, and the gap between the panes is closed by a seal (48) near the perimeter of the panes. A thermally conductive, hermetically sealed receptacle (36) is positioned between the panes. The receptacle contains a phase change material (38) that reversibly absorbs, stores, and releases heat in response to temperature changes at least at one of the glazed panes.

18 Claims, 4 Drawing Sheets

SUPPRESSING HEAT FLUX IN INSULATING GLASS STRUCTURES

CROSS-REFERENCE TO RELATED APPLICATIONS

This application claims the benefit of the earlier filing date under 35 USC 119(e) and 35 USC 120 of United States Provisional Patent Application Serial No. 60/294,498, filed May 29, 2001.

STATEMENT REGARDING FEDERALLY SPONSORED RESEARCH OR DEVELOPMENT

Not Applicable

BACKGROUND OF THE INVENTION

1. Field of the Invention

The invention generally relates to stock material such as light transmissive sheets with gas space between and a sealed edge, such as a double glazed storm window. Similarly, the invention generally relates to static structures such as a composite prefabricated panel including adjunctive means. More specifically, the static structure may have a sandwich or hollow structure with sheet-like facing members, especially parallel transparent panes such as a double glass window panel. The invention also relates to an internal spacer between parallel transparent panes. The static structure may be a hermetically sealed opaque or transparent panel. In a further aspect, the invention generally relates to adhesive bonding and methods for surface bonding and assembly, especially for making a multi-pane glazing unit with air-spaced panes.

2. Description of Related Art Including Information Disclosed Under 37 CFR 1.97 and 1.98

Insulating glazing ("IG") structures include double glazed windows and other multi-pane glazing units. These structures are ubiquitous in modern architectural construction, both residential and commercial, where they are commonly found as windows, glass walls, and doors. A primary technological problem faced by IG units is their low insulating value, relative to many other types of insulated panel and wall structures. In both hot and cold climate conditions, a low insulating value results in energy loss from a building that is either heated or cooled by an energy consuming system, such as a heating system or a cooling system that directly or indirectly consumes fuel. On a broad scale, the challenge presented by IG structures is to reduce energy loss through them and to reduce the resultant higher costs for basic utilities in the buildings using IG structures.

Typically, an IG unit is formed of two or more glass panes, spaced apart by a mechanical spacer to form a central air space or interlayer, and sealed at the peripheral edge of the panes to prevent entry of humidity. In substantially all commercial IG units, the central air space is a dead air space, because the IG unit is sealed as a static unit, with no opportunity for exchange of gas from this central space. Although terms such as "air" and "air space" are commonly used in connection with the internal central space of an IG unit, unless context dictates otherwise these terms do not imply that the gas is or should be limited to the mixture commonly referred to as air. As described below, one or more specific gasses other than ordinary air are used to fill the air space. Most commonly the construction of an IG unit is a hermetically sealed glazing assembly in which two similarly sized glass panels, which may be defined as interior and exterior panes, are bonded along their corresponding edges by structural sealants and moisture barriers to opposing surfaces of a central parametric spacer tube. The spacer often is about one-half inch (13 mm) by ⅜ inch (10 mm) thin wall metallic tube, which is perforated and contains a desiccant agent. The central air space is defined by the glass panels and the spacer tube. The central insulating air space is dried by exposure to beads of desiccant stored within the perimeter spacer tube. The tube is perforated and vented to the insulating central air space along its interior parametric surface.

Modifications to this basic design have focused on methods of improving insulating values of sealed glazing assemblies through 1) deposit of a transparently thin metal oxide coating on the surface of exterior glass panes to filter and trap radiant energy; 2) addition of a third glass panel and corresponding second parametric spacer and insulating air space to further constrain thermal conduction through the assembly; 3) introduction of low-conductive gases such as argon and krypton into the central insulating air space, replacing some or all of the normal air with the selected gas; 4) replacement of perforated metallic perimeter spacer tubes with a variety of alternative spacer configurations employing materials exhibiting low thermal conductivity, and 5) various combinations of these methodologies.

As a group, these modifications are passive in that their approach to improving insulating values of sealed glazing assemblies proceed from a common premise. Uniformly, they seek to provide more effective intervening barriers to conduction of temperature extremes through sealed glazing assemblies and into interior living and working quarters. Only the metal oxide coating provides a benefit other than lower thermal conduction rates. Coated glass also reflects certain wave lengths of light while passing other light through to the interior. Metal oxide coatings also create a spectrum of new problems, in that direct sunlight on these coatings causes excessive heating in exterior glass panes and contributes to thermally induced breakage of glass, failure of structural seals, failure of vapor barriers and disintegration of the glazing units due to differing rates of linear expansion of constituent components.

Edge seal systems are an area of considerable research. The spacer can have considerable variation in its design and material of construction. Spacers commonly are formed of aluminum, steel, or polyvinyl chloride. Spacer shapes can be tubular or an open-sided channel. In addition, spacers often contain a desiccant to reduce moisture content of the gas or air in the air space, thus preventing condensation within the IG unit or at least delaying the time period when condensation will occur. Various materials are used as the sealant, with considerable variation in success of keeping out air and humidity. Sometimes the glass panes are held in position by the sealant, while other designs employ an exterior channel or keeper to hold the panes in place.

Energy transmission through the edge portion of an IG unit is well known to be greater than through the dead air space at the center of the unit. The pathway through the edge seal and spacer tends to be much more conductive, with the result that as exterior temperature decreases, the interior surface temperature of an IG unit tends to be significantly lower at the edges. Thus, when moisture is present, condensation starts near the edges and spreads over an entire IG unit as exterior temperature decreases.

The study of energy transmission near the edge of an IG unit is such a significant area that it has gained special recognition as "warm-edge technology" or "WET." The goal of WET is to enhance both condensation resistance and thermal resistance at the perimeter of the IG unit, particularly in the 63 mm (2.5 inches) above the sight line of the IG perimeter. While studies are concentrated on this perimeter area as the initially effected area, studies confirm that temperature changes begin at the edge of an IG unit and continue toward the center of the glass until the change reaches the center. Thus, the 63 mm perimeter is an area of primary concern, although the effects concern the entire IG unit.

Studies with spacer bars of different thermal conductivity have shown that the temperature of the glass surface on the warm side of an IG unit increases with the thermal resistance of the spacer bar material. Thus, many improvements in construction of IG units have focused upon the material and design of the spacer in order to increase thermal resistance.

Commercial, industry standard, dual pane insulated glazing units with metallic spacer tubes, as widely manufactured according to present practices, have predictable properties. This type of industry-standard product will be referred to as the conventional product. The conventional window provides thermal insulating properties that are sufficient for the intended use when exterior temperatures are of a moderate range, such as greater than 35° F. (1.67° C.) and less than 85° F. (29.44° C.). Relatively more extreme exterior temperatures, outside the defined moderate range, overwhelm the thermal insulating properties of the conventional dual pane window and door products. The results are excessive interlayer heat flux, a consequential loss of living-space comfort, condensation of water vapor on interior glass, ice formation on interior glass, and substantially higher heating and cooling costs.

Insulated glazing units are comprised of various materials each having a characteristic rate of thermal conductivity. As a practical matter, perimeter metallic spacer tubes serve as a thermal bridge in conventional insulated glazing units. Dual glass panes and interlayer air have respective thermal conductivity of 0.5971 Btu/hour-foot-degree F. (1.033 Watts/(Meter-degree K)) and 0.0139 Btu/hour-foot-degree F. (0.0139 Watts/(Meter-degree K)), while aluminum and steel spacer tubes have respective thermal conductivity of 135 Btu/hour-foot-degree F. (233 Watts/Meter-degree K)) and 11.2 Btu/hour-foot-degree F. (19.376 Watts/Meter-degree K)).

With the exception of coated glass and certain external heat exchange devices, prior methods for suppressing heat flux in insulating glass have focused on replacing highly conductive constituent materials with other materials that are less efficient thermal conductors. While there is strong need and desire to improve the insulating characteristics of multi-pane glazing units, little apparent consideration has been given to eliminating temperature gradients, formed across the interlayer, as an alternative method of suppressing interlayer heat flux. In some cases, thermal efficiency of an IG assembly has been improved by using low conducting materials. However, certain negative consequences attend the use of such alternate materials, including a relative high cost of low conduction materials, a significant loss of manufacturing productivity, and substantial constraints on IG unit size and shape.

The problems of heat flux at the edges of IG units are somewhat similar to problems in hollow aluminum or steel sash and framing components of certain window and door assemblies. The poor insulating characteristics of aluminum window and door framing systems have driven many window manufacturers to adopt PVC or composite alternatives in place of aluminum extrusions.

However, an exception to this trend to use PVC and composite is found with fabricators of curtain-wall window and door systems most commonly seen in large scale architectural projects. The low cost, strength and durability of aluminum window and door framing systems in such construction projects apparently outweigh insulating inefficiencies. Nonetheless, energy costs drive the specification of coated glass IG units for these projects to achieve lower operating costs. This apparent conflict in efficiencies can be better understood by an explanation of a measurement standard known as "U-value," which often is used in specifying curtain wall systems. U-values measure insulating efficiency at the center-of-panel rather than at the critical edge area. The U-value specification standard largely ignores the relative inefficiency of aluminum framing in curtain wall systems.

Two patents have suggested benefits in heating windows in automobiles, although neither addresses reducing thermal conductivity nor increasing condensation resistance. Both suggest warming the interlayer of a double layer automobile windshield. U.S. Pat. No. 6,066,372 to Miles proposes placing a reservoir of anti-freeze solution at the base of the windshield. U.S. Pat. No. 3,807,791 to Boyer warms the interlayer with an electrical resistance heater in the edge seal of the windshield.

Windows in architectural structures have been externally heated or cooled in various ways. German Patent 40 24 143 to Koester circulates a heating or cooling fluid from an external heat exchanger through the spacer between panes. German Patent 197 44 423 to Loewe pumps a heated or cooled fluid, which may be water, around a door or window. U.S. Pat. No. 4,155,205 to Polman controls condensation by placing a heat conductive metal rod in communication between the interlayer and outside weather. The rod serves as a cold spot that preferentially condenses moisture. U.S. Pat. No. 5,087,489 to Lingemann proposes an IG unit with electrical resistance elements deposited on the inside face of one pane, and with a two part spacer having an insulating urethane center strip for low thermal conductivity between the heated and unheated panes.

An IG unit can be used as part of a solar collector, although the solar collector art is qualified and limited by the need for the collector to face the sun. Such technical issues as reducing thermal conductivity or increasing condensation resistance at the edge of an IG unit can be relevant to solar collectors as well as to architectural applications. However, the technical solutions are not universally applicable to both applications if they rely on solar-related attributes, since many architectural IG units do not face the sun.

A representative solar collector using an IG unit is U.S. Pat. No. 2,595,905 to solar pioneer M. Telkes, in which an IG unit serves as a front wall that transmits sunlight to a separate collector cell filled with phase change material. The cell is bordered with venetian blinds for directing input and radiation of collected heat. Other patents placing a window in front of a collector cell include U.S. Pat. No. 4,739,748 to Stice and U.S. Pat. No. 4,421,101 to Stice. U.S. Pat. No. 4,412,528 to Elzinga uses a single pane of glass with mirrored edges to direct solar radiation into a heat storage reservoir filled with phase change material ("PCM").

Phase change materials ("PCMs") are known for their thermal storage properties in solar collectors. They have found special utilization in window structures by changing opacity. U.S. Pat. No. 4,532,917 to Taff et al. discloses filling the interlayer with a PCM that shifts from transparent to translucent with dropping temperature, thereby increasing solar absorption. Achieving a similar result, an IG unit according to U.S. Pat. No. 6,001,487 to Ladang is electrically actuated to change the opaque quality of a glass pane coated with electrochromic material.

Certain of these patents appear to have notable deficiencies and limitations. This seems evident, for example, in those that would substitute one source of energy loss with another, such as those supplying external energy into an interlayer in order, supposedly, to reduce energy loss from within the living spaces of a building. Whether the net loss is different, after both sources of energy have been considered, seems questionable. The concept of windows plumbed for circulating fluids or electricity also creates new burdens on building construction. IG units that change opacity in order to change their solar absorption perhaps are effective if used on those limited numbers of walls exposed to sunlight, but the altered opacity degrades or sacrifices the viewing quality of the window. Thus, many of the suggested concepts are of little use or unlikely to be accepted for commercial and architectural applications.

A highly desirable improvement in IG units and structures would be a means for reducing energy transmission that operates passively and without a need for external plumbing, additions or alterations to the general structure and viewing function of an IG unit. Such an improvement would be adaptable to the countless buildings already in existence without modification other than the one-for-one replacement of IG units. Further, it would be desirable to reduce heat flux through metal framing and sash members by using similar methods to reduce temperature gradients.

To achieve the foregoing and other objects and in accordance with the purpose of the present invention, as embodied and broadly described herein, the insulated glazing structure and method of operation of this invention may comprise the following.

BRIEF SUMMARY OF THE INVENTION

Against the described background, it is therefore a general object of the invention to provide an improved apparatus and method for suppressing heat flux in insulating glazing products. Such suppression of heat flux is preferred to be through characteristics of the materials incorporated into the IG structure, acting in response to rising or falling temperature on one face of the structure.

The IG structure employs an un-vented, thermally conductive, hermetically sealed spacer element containing phase change material (PCM). Such spacer is located in an interlayer between spaced, parallel sheets of glazing, such as in double glass window panels, especially in such panels having a metal oxide coating on the exterior pane. The phase change material, by its inherent ability to absorb and release heat, suppresses or delays temperature differentials within a dual-glazed panel. Avoiding extreme temperature flux is helpful in preserving moisture barriers, preserving structural seals, and avoiding heat induced glass breakage.

Another object is to improve the effective range of IG units from their present moderate range of about 30° F. (−1.1° C.) to 85° F. (29.4° C.). More extreme exterior temperatures overwhelm the thermal insulating properties of conventional dual pane window and door products. The result is excessive interlayer heat flux and significant loss of living-space comfort. Other effects can include condensation of water vapor on interior glass, ice formation on interior glass and substantially higher heating/cooling costs. These effects can be avoided by suppressing heat flux over an improved range of temperatures.

Still another object is to provide a technology for suppressing heat flux, adaptable to metal framing and sash members as often used in architectural curtain-wall structures.

The effects of extreme exterior temperatures are conducted most readily through an insulated glazing unit at the perimeter spacer, which is at the edge of glass. Therefore, an important object is to moderate the edge effects by a strategically positioning a phase change material (PCM) in a parametric reservoir around the interlayer. The PCM undergoes a phase transition to produce a spontaneous transfer of heat when triggered by a temperature gradient that spans the phase transition temperature of the PCM.

Another object is to provide adequate latent heat capacity for effective control of interlayer heat flux. A phase change material in a parametric reservoir should provide an in-place density greater than 7.0 grams of paraffinic oil PCM per cubic inch volume of sealed parametric reservoir (114.8 grams PCM/milliliter of reservoir). In addition, the reservoir should have at least a 0.06 square inch (38.7 square millimeter) enclosed profile area.

A further object of the invention is to maximize the duration of latent heat exchange with the interior field glass pane during phase transition. This can be achieved through use of high shoulder sealed perimeter reservoir tubes.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to one aspect of the invention, an improved glazing assembly is formed of at least first and second juxtaposed glazed panes. An interlayer separates the panes and contains a gas. The edges of the panes are closed by a seal. The improvement is a thermally conductive, hermetically sealed receptacle positioned between the panes and containing a phase change material (PCM). The PCM contained within the receptacle reversibly absorbs, stores, and releases heat in response to a temperature change applied at least at one pane of the glazing assembly.

Another aspect of the invention is a method of suppressing heat flux due to a temperature gradient applied between juxtaposed panels of a multi-panel structure formed of at least an inner panel and a juxtaposed outer panel, separated from each other by an interlayer. A first step is providing a closed reservoir between the inner and outer panels and in communication with the interlayer. A second step is providing within the closed reservoir a resident phase change material having a transition temperature within the temperature gradient. A third step is suppressing interlayer heat flux by establishing a transient plane of near temperature equilibrium within the resident phase change material of the reservoir.

The accompanying drawings, which are incorporated in and form a part of the specification illustrate preferred embodiments of the present invention, and together with the description, serve to explain the principles of the invention. In the drawings:

DETAILED DESCRIPTION OF THE INVENTION

Figure 1:
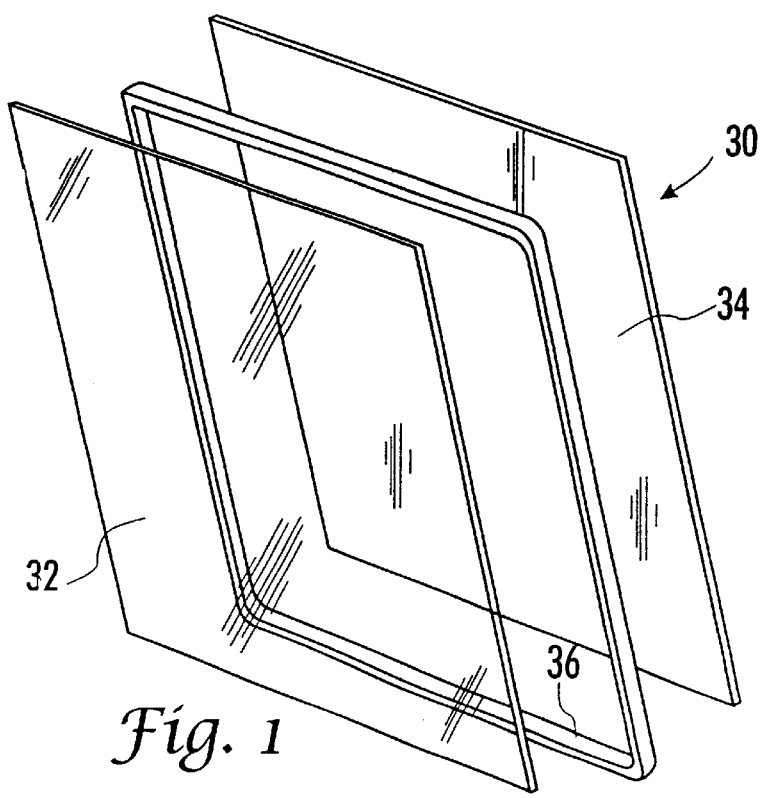
FIG. 1 is an exploded isometric view of components of an insulating glazing structure.

The invention is an improved insulated glazing (IG) unit that suppresses heat flux through use of a self-contained, self-regulating, thermally activated, transient barrier to heat flux, especially edge-of-glass heat flux. The barrier is preferred to be configured as a continuous column of paraffinic oil phase change material (PCM), securely sealed within a metallic perimeter reservoir within the IG unit. The perimeter reservoir is ideally positioned and configured to serve an additional function as a spacer device that separates two glazing layers of an IG unit and thereby substantially defines a central dead air space or interlayer.

PCMs are defined by their capacity to absorb, store and release relatively large amounts of latent heat, over a narrow temperature range, while undergoing reversible physical or chemical changes, such as phase changes. Latent heat is insentient energy stored within a PCM at its molecular bonds. Ordinary, non-PCM materials, store and release heat over the entire range of their exposure to changing temperatures exhibiting continuous, sensible temperature change as stored energy content varies. PCMs combine sensible and latent energy storage; consequently, they store much larger amounts of energy per unit of mass than simpler, sensible thermal storage materials.

Some of the data reported in this specification arose in a mixed set of English and metric units of measurement. Throughout this specification, units of measurement are given as commonly found, obtained, or reported. Where such units are not already metric, a metric conversion will follow in parentheses. In the event of conflict between reports of the same data, the original, non-parenthetical figure should be taken as correct.

Conventional IG products are distinguished from the invention by the absence of a sealed parametric reservoir containing PCM. PCMs, as recommended for use in this invention, are paraffinic oils that are alkanes having a thermal conductivity of about 0.0865 Btu/hour-foot-degree F. (0.1496 Watts/(Meter-degree K)). The preferred PCMs are saturated hydrocarbons. The preferred saturated hydrocarbons are known as normal paraffins and straight chain paraffins. These are represented by the general Formula 1:

$C_nH_{2n+2}$ where n equals an integer representing the number of carbon atoms in the molecule. Of particular importance are paraffinic oils, synthetic paraffins, and alkanes that contain between twelve (12) and twenty-four (24) carbon atoms, inclusive.

When selecting a PCM for use in the invention, the intended application for the IG unit may influence the choice. Significant factors include:

(1) The type of heat exchange required. Crystallization releases latent heat to the glass panes and fusion absorbs heat from the glass panes.

(2) The temperature at which a given type of heat exchange occurs.

(3) The latent heat content/capacity available for transfer at phase change.

For example, in one common application the surface temperature of the interior glass pane, edge-of-glass region, should be maintained at a minimum of 40° F. (4.4° C.) as the exterior field temperature drops to 0° F. (−17.8° C.). Preferred PCM selections would be normal paraffinic oils and alkanes, specifically n-tetradecane, variants of tetradecane, and paraffinic oil combinations such as NORPAR 14 and NORPAR 15 (NORPAR is a trademark of Exxon Corporation, Houston, Tex.). These choices have characteristic latent heats of about 4600 Btu/cubic foot (171626000 joules per cubic meter) and crystallization temperatures of about 42° F. (5.5° C.), 37° F. (2.8° C.) and 45° F. (7.2° C.), respectively. Other potentially suitable low transition temperature paraffinic PCMs include n-pentadecane, n-tridecane and n-dodecane.

In a second example application, an interior pane surface, edge-of-glass region, is to be maintained at a maximum of about 85° F. (29.4° C.) as exterior temperatures exceed 90° F. (32.2° C.). Preferred PCM selections are paraffinic oils or alkanes including n-hexadecane, n-heptadecane, n-nonadecane, n-eicosane and n-octadecane. Their respective fusion temperatures are about 62° F. (16.6° C.), 71° F. (21.6° C.), 89° F. (31.5° C.), 98° F. (36.6° C) and 82° F. (27.7° C.). Each has high latent heat capacity of about 5200 Btu/cubic foot (194012000 joules per cubic meter), low thermal conductivity, and high density.

For the best mode of performance, the invention should provide adequate latent heat capacity for effective control of interlayer heat flux. A desired in-place density of the PCM is greater than 7.0 grams of paraffinic oil per cubic inch volume of sealed parametric reservoir (114.8 grams per milliliter of reservoir). Additionally, a sealed parametric reservoir should have no less than a 0.06 square inch (38.7 square millimeter) enclosed profile area. Further, the sealed perimeter reservoir tube should be configured to maximize the duration of latent heat exchange with the interior field glass pane during phase transition. The preferred configuration of the tube employs a high shoulder.

The following Chart 1, Hydrocarbons, Normal Paraffins, Paraffinic Oils & Alkanes Comprising Preferred PCMs, shows significant characteristics of each PCM and can be used to an aid in selecting a suitable PCM for each application. Further, the following formulas 2 and 3 can be used to calculate the expected exterior transition temperature that will cause a specific PCM to melt or freeze, thereby absorbing or releasing heat from IG glass surfaces. This information is useful for selecting an appropriate PCM for injection into the spacer-reservoir of an IG unit and provides a climate specific suppression of interlayer heat flux capability to the edge-of-glass system of this invention.

Formula 2 for release of latent heat content of PCM to IG glass surfaces in suppression of the effect of cold exterior temperatures:

((PCM Crystallization Temp.×2)−70)+9=Exterior IG Transition Temp.

Formula 3 for absorbing excess heat from IG glass surfaces in suppression of the effect of hot exterior conditions:

((PCM Fusion Temp.×2)−70)=~Exterior IG Transition Temp.

In both Formula 2 and Formula 3, temperatures are expressed in degrees F.

spacer, at the interlayer. As a result, any heat gradient within the PCM-filled parametric reservoir of an IG unit will be compressed. At phase change, a compensating heat transfer within the PCM serves to flattened any heat gradient along a line or arc of near temperature equilibrium, thereby creating a transient barrier to heat flow.

Testing can demonstrate that the technology of flattening a temperature gradient is superior to the technology of merely reducing conductivity of an IG unit. An IG test unit that employs a PCM-charged, sealed metallic spacer at the

CHART 1

Hydrocarbons, Normal Paraffins, Paraffinic Oils & Alkanes Comprising Preferred PCMs

|  | Formula | Fusion Temp ° F. (° C.) | Crystallization Temp ° F. (° C.) | Latent Heat Content/ Capacity Btu/CuFt | Exterior IG Transition Temp ° F. (° C.) Interior @ 70° F. constant |
|---|---|---|---|---|---|
| n-dodecane | $C_{12}H_{26}$ | N/A | ~10 (−12.2) | NA | −41 (−40.5) |
| n-tridecane | $C_{13}H_{28}$ | N/A | ~21 (−6.1) | NA | −19 (−28.3) |
| NORPAR-14 | $C_{14}$ variant | N/A | ~37 (2.7) | NA | 13 (−10.5) |
| n-tetradecane | $C_{14}H_{30}$ | N/A | ~42 (5.5) | 4600 | 23 (−5.0) |
| NORPAR-15 | $C_{15}$ variant | N/A | ~45 (7.2) | NA | 29 (−1.6) |
| n-pentadecane | $C_{15}H_{32}$ | N/A | ~50 (10.0) | 4200 | 39 (3.8) |
| n-hexadecane | $C_{16}H_{34}$ | N/A | ~62 (16.6) | 5360 | 63 (17.2) |
| n-heptadecane | $C_{17}H_{36}$ | ~71 (21) | N/A | 4500 | 79 (26.1) |
| n-octadecane | $C_{18}H_{38}$ | ~83 (28) | N/A | 5070 | 87 (30.5) |
| n-nonadecane | $C_{19}H_{40}$ | ~90 (32) | N/A | NA | 101 (38.3) |
| n-eicosane | $C_{20}H_{42}$ | ~98 (36) | N/A | 5150 | 117 (47.2) |
| n-heneicosane | $C_{21}H_{44}$ | ~105 (40) | N/A | 4100 | 130 (54.4) |
| n-docosane | $C_{22}H_{46}$ | ~111 (43) | N/A | 5090 | 143 (61.6) |
| n-tricosane | $C_{23}H_{48}$ | ~118 (47) | N/A | 4770 | 157 (69.4) |
| n-pentacosane | $C_{25}H_{52}$ | ~121 (49) | N/A | NA | 163 (72.2) |
| n-tetracosane | $C_{24}H_{50}$ | ~123 (50) | N/A | NA | 167 (75.0) |

Notes to Chart 1: N/A = Not Applicable; NA = Not Available

Thermal conductivity is the capacity of a substance to transfer heat. Establishing a temperature gradient extending across highly conductive conventional metallic spacer tubes is a necessary driver of interlayer heat flux in insulated glazing units. The invention suppresses heat flux in the spacer tube, thus interrupting or creating a discontinuity in the temperature gradient. For example, at crystallization of the PCM, the balance of heat inputs from interior and exterior sources causes the centrally-positioned PCM to release stored latent heat to the metallic spacer. Alternately at fusion of the PCM, the balance of heat inputs causes the PCM to absorb heat from the spacer. These two examples demonstrate that compensating heat transfers between the spacer tube and PCM during a phase transition will interrupt any temperature gradient that has been established within the spacer. Interrupting the warm-to-cold temperature gradient of the perimeter metallic spacer halts heat flow through the highly conductive metallic spacer. The spacer no longer performs as an efficient thermal bridge. As a result, thermal conduction through the insulated glazing unit is substantially halted.

Interlayer heat flux requires a temperature gradient. The direction of heat flow is from a relatively warm field to a relatively cool field. A steep temperature gradient will lead to a faster rate of heat flow. If a condition of temperature equilibrium is established, there is no temperature gradient and, therefore, no interlayer heat flow.

The invention establishes a transient line of near temperature equilibrium within the resident PCM of the metallic perimeter will show a flattened or reduced temperature gradient as the temperature differential between its opposite sides increases. A conventionally constructed IG unit with a non-PCM-charged, non-sealed metallic spacer at the perimeter will show an ordinary temperature gradient produced by the conventional technology of merely reducing conductivity. In head-to-head testing, 10%+reduction in heat loss has been found to result from formation of a transient liquid-to-solid phase interface plane within the resident PCM, parallel to the spacer/reservoir's longitudinal axis and extending continuously around the perimeter spacer of the test unit. During one five hour test period, approximately 40 Btu of stored latent heat was liberated from 185 grams of crystallizing tetradecane PCM to the metallic spacer enclosure, thereby interrupting loss of ambient heat through the spacer.

FIG. 1 shows the general construction of the invention to include a multi-panel structure such as an insulated glazing (IG) unit 30 or sub-unit thereof of preferred construction. The IG unit is formed of multiple panels such as two flat sheets of glass or other glazing panel. For convenience of identification and description, the two panels or sheets may be referred to as an interior panel or sheet 32 and an exterior panel or sheet 34, although in many cases the two sheets are identical. These designations have added meaning in certain applications, such as that the interior sheet 32 faces the inside space of a building structure, which typically is artificially heated or cooled in order to sustain a controlled or somewhat constant temperature or to adjust or alter temperature according to the needs or purpose of the interior space. Commonly, artificial or power driven means for heating, ventilating, and air-conditioning are employed for the benefit of people within a living or working space of a building. In other applications, the interior sheet may face an area in which local climate is controlled to meet the requirements of other types of temperature-sensitive content such as equipment, instruments, or plants.

The designation of an exterior sheet 34 has additional significance when this side of the IG unit is exposed to relatively greater temperature swings than the interior side. These may be unregulated or natural temperature swings, such as those caused by variations in ambient weather conditions and climate. Temperature swings may be rapid or slow. Rapid changes are, for example, those caused by passing weather fronts, changing exposure to sunlight, and variations between day and night. Slow changes are those caused, for example, by changing seasons. The changes occurring on the exterior side typically are opposed and offset within space on the interior side of the IG unit by artificial heating, ventilation, or cooling. Thus, the "interior side" refers to the side of the IG unit on which the range of temperature fluctuation is relatively more limited, as compared to a relatively greater range of temperature fluctuation on the "exterior side." The designations of interior and exterior sides, and the broad function of the invention, do not depend upon the presence of a direct source of solar radiation. Because heat gain from solar radiation is not a necessary factor, this invention can be successfully deployed in wall mountings that are not exposed to sunlight or that face any direction without regard to the position of the sun. This characteristic permits this technology to be applied to insulated glass panels and doors of refrigerated display cases, which typically are positioned centrally within buildings. Enabling temperature gradients are provided by defrost cycles within a refrigerated case and by any variations in ambient temperature within the building. In the case of a refrigerated display case located in a temperature controlled store, the temperature gradient may be somewhat constant at all times except during defrost cycles within the case. Thus, the side of the IG unit facing inside the case may be assigned as the exterior side of the IG unit.

A sealed reservoir 36 of phase change material (PCM) is positioned between the panels or panes of glazing material, where the reservoir also may serve as a spacer for holding the two panes at a preselected distance. The reservoir is in communication with the interlayer, preferably at the perimeter of the IG unit. While the IG unit is described to require only two panels of a glazing material such as glass, a greater number of spaced apart glazing panels can be used, such as three or more. Where more than two sheets are used, each juxtaposed pair of glazing sheets defines a separate interlayer with one pane generally facing an interior direction and the other facing the exterior direction. A reservoir 36 of phase change material can be used in each interlayer. Alternatively, the reservoir 36 of phase change material may be employed in only one interlayer or in a variable selection of the available interlayers.

The preferred structure of a reservoir 36 is a hollow, thin wall, metallic tube. The preferred placement of the reservoir 36 is at the perimeter of the IG unit in order that the size of the reservoir be maximized while substantially removing the reservoir from sight through the IG unit. In addition, the parametric placement maximizes the surface area interface between the reservoir and the central volume of the interlayer. The reservoir tube is sealed so that the contained phase change material cannot escape into the interlayer of the IG unit. The seal can be either an end seal, at each end of the tube, or a junction between opposite open ends of the tube.

A column with sealed opposite ends provides a closed linear reservoir containing a charge of phase change material. The column can be shaped as required to fit the perimeter of the IG unit. For example, the column can be bent and formed into a rectangle, with the opposite ends placed near each other to substantially close the rectangle. In some situations, the column may be bent and formed to extend along only a portion of the perimeter, such that the ends of the column are not near each other. Two or more reservoir columns can be employed in the same IG unit, either positioned sequentially, such as end-to-end, or spaced at distant parts of the IG unit. The preferred application of linear reservoir elements to an IG unit is in substantially continuous perimeter positions as shown by the general perimeter positioning of the reservoirs 36 in the drawings, thus creating an interface of maximum surface area with the central volume of the interlayer.

A junction seal provides a closed loop reservoir containing a charge of phase change material. The closed loop configuration can be formed into a closed geometric figure such as a rectangle. The absence of spaces or gaps between ends can offer efficient application of the phase change material to the interlayer. Whether the reservoir 36 is a closed loop system or a linear system, it should be sized and positioned to fit immediately even with or slightly within the perimeter defined by the edges of the glazing sheets. An inset from the perimeter may be useful to permit room for an edge seal, as known in the art for insetting pane spacers. Such insets of pane spacing elements are often only a few millimeters or fractions of an inch. Thus, reference to positioning the reservoir 36 at the perimeter of the IG unit encompasses, without limitation, a positioning between sheets of glazing material near or juxtaposed to an edge seal that is at least partially between the glazing sheets and positioned at the outside edge of the reservoir. Reference to positioning the reservoir at the perimeter of the IG unit and references to a parametric reservoir are intended to refer to equivalent positions found and practiced in the art of producing IG units, for placing spacer elements in IG units. This sizing and positioning allows the tubing to be effective to space apart the glazing sheets at their edges with minimum visual impact. This positioning also is preferred as positioning the phase change material in optimal position to suppress heat flux at the area where edge effects are prevalent.

Figure 2:
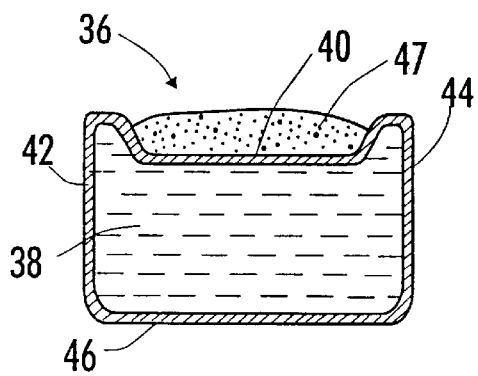
FIG. 2 is a vertical cross-sectional view taken across a tubular PCM reservoir.

With reference to FIG. 2, the interior of the reservoir tube 36 contains and preferably is substantially filled with a volume of phase change and heat transfer means 38. Suitable agents are thermally activated paraffinic oils or alkanes, which are well suited for use in the temperature conditions over many populated areas of the world. Suitable PCM materials are saturated hydrocarbons. These include materials known as normal paraffins and straight chain paraffins. Of particular importance are paraffinic oils, synthetic paraffins, and alkanes that contain between twelve and twenty-four carbon atoms, inclusive.

The selection of a suitable PCM involves several key issues. First is the type of heat exchange required. Crystallization releases latent heat to the glass panes, while fusion absorbs heat from the glass panes. Second is the temperature at which a given type of heat exchange occurs. Third is the latent heat content/capacity available for transfer at phase change. Normal paraffinic oils and alkanes, and specifically tetradecane and variants of tetradecane and paraffinic oil combinations such as NORPAR 14 and NORPAR 15, have characteristic latent heats of about 4600 Btu/cubic foot (171626000 joules/cubic Meter) and crystallization temperatures of about 42° F. (5.5° C.), 37° F. (2.8° C.) and 45° F. (7.2° C.), respectively. These are particularly well suited for maintaining the surface temperature of the interior glass pane, edge-of-glass region, at a minimum of 40° F. (4.4° C.) as the exterior field temperature drops to 0° F. (−17.8° C.). The combination of phase change materials and IG structures may have varied embodiments according to operational circumstances. According to one set of operational requirements, an extreme temperature gradient such as from 0° F. (−17.8° C.) on the exterior to 70° F. (21.1° C.) on the interior is communicated to a combined perimeter spacer tube and sealed reservoir filled with PCM. The resident PCM spans an approximate 40° F. (4.4° C.) crystallization temperature. The temperature gradient causes a gradual release of approximately 40 Btu of latent heat, to a 2½ inch (63 mm) wide edge-of-glass area of a 16 inch×30 inch×⅝ inch (40.64 cm×76.2 cm×15.625 mm) insulated glazing unit containing approximately 185 grams of paraffinic oil PCM, during a liquid to solid phase transition lasting approximately six hours.

A second operational environment may call for maintaining the interior pane surface in the edge-of-glass region at a maximum of about 80° F. (26.7° C.) as exterior temperatures exceed 90° F. (32.2° C.). The chosen PCM may include normal paraffinic oils and alkanes, including hexadecane, heptadecane, nonadecane, eicosane and octadecane. Their respective fusion temperatures are about 62° F. (16.5° C.), 71° F. 21.6° C.), 89° F. (31.6° C.), 98° F. (36.6° C.) and 82° F. (27.7° C.). Each has a high latent heat capacity of about 5200 Btu/cubic foot (194012000 joules/cubic meter), low thermal conductivity, and high density.

In transverse cross-section, the profile of the reservoir tube should be approximately rectangular. In the view of FIG. 2, the top wall 40 is an inner surface that faces the central volume of the interlayer. The left side wall 42 can be regarded as an interior wall that will face an interior glazing panel in an assembled IG unit. The right side wall 44 can be regarded as an exterior wall that will face an exterior glazing panel in an assembled IG unit. In symmetric designs, the walls 42 and 44 are equivalent and interchangeable in orientation within an IG unit. The bottom wall 46 is an outer parametric surface, lying at or near the outer edges of the glazing panels. A desiccated matrix 47 is placed on the top wall and between the glazing panels, where it acts to absorb moisture from the interlayer. The side walls 42 and 44 can extend upwardly above the top wall 40 where maximum glass contact area is desirable.

Figure 3:
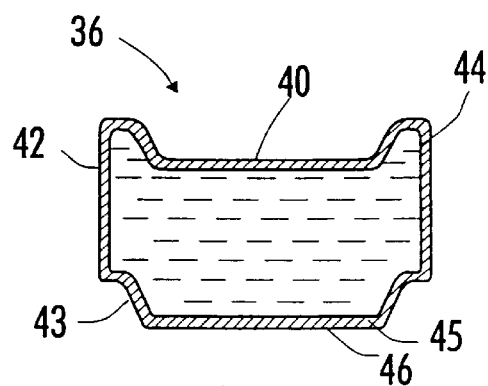
FIG. 3 is a view similar to FIG. 2, showing a modified cross-section of the tubular reservoir.
Figure 4:
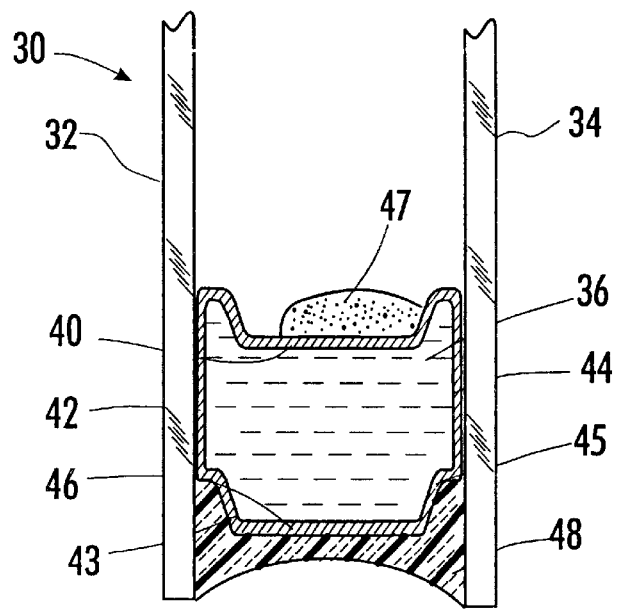
FIG. 4 is a fragmentary vertical cross-sectional view taken at one edge of an insulating glazing unit.
Figure 5:
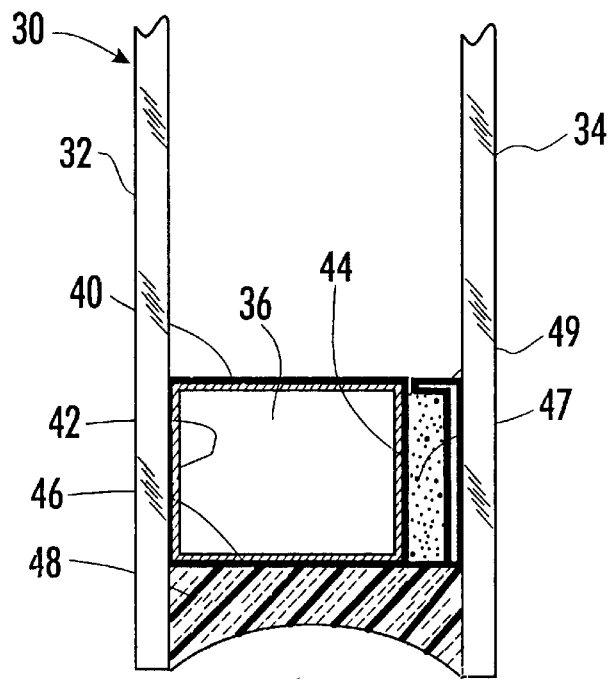
FIG. 5 is a view similar to FIG. 4, showing a modified embodiment of the tubular reservoir and desiccant.
Figure 6:
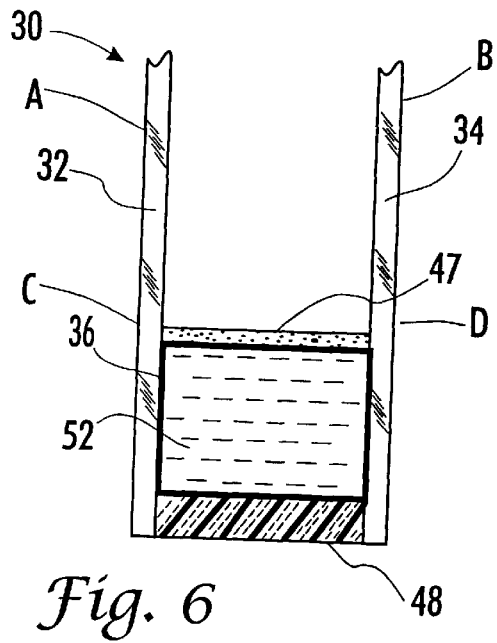
FIG. 6 is a view similar to FIG. 4, showing the PCM in the tubular reservoir during a heat flux test.

One or both shoulders may be partially recessed or offset inwardly. As shown in FIG. 3, side wall 42 may be recessed at wall portion 43 next adjacent to the bottom or outer wall 46, and side wall 44 may be recessed at portion 45 next adjacent to wall 46. This recessed structure reduces surface contact area with the juxtaposed glass pane. In an assembled view with glass panes as shown in FIG. 4, one shoulder 44 of the reservoir may be in surface contact with the exterior pane. A bead of desiccated matrix 47 is placed near the shoulder 44. In still another modification as shown in FIG. 5, the desiccant is located in a layer between the PCM reservoir 36 and the exterior pane, with a suitable spacer 49 providing structural support.

The side walls 42,44 forming the shoulders are coated with a polyisobutylene moisture barrier and sealant film. This film should entirely cover the glass contact area of the interior and exterior shoulders of the reservoir in order to function as a moisture barrier. The film also functions as an interface layer that bonds the reservoir to juxtaposed glazing sheets 32,34.

According to conventional construction practice, which also is desirable in IG unit 30, a primary edge seal 48 is positioned at the outer edge of an IG unit. This seal performs a variety of functions. First, it is a barrier to entry of moisture into the interlayer. Second, it functions as a continuous structural bond between the glazing panels at the perimeter of an IG unit. Third, it functions as an additional bond that secures the reservoir 36 in a parametric position in the IG unit. The primary edge seal typically will cover the outer parametric surface of reservoir and the adjacent ultimate portions of the inner faces of the glazing panel 32,34. An acceptable edge seal can be constructed of polyurethane and should be of a thickness greater than 3 mm (⅛ inch). Other types of edge seals also are known and used, although the described seal 48 is presently preferred.

In some respects, methods of assembling the insulated glazing unit 30 are known in the art. However, the configuration and manner of processing both the sealed perimeter reservoir 36 and the phase change material 38 contained by the reservoir are unique. A preferred material of construction for reservoir 36 is thin-wall, roll-formed aluminum, steel, or other metallic material with properties of good resistance to mild solvents, malleable, an efficient thermal conductor, and readily welded using laser or radio frequency based equipment. The reservoir 36 is formed in the shape of an elongated sealed tube that is a dependably leak-proof container for resident phase change materials 38 in their liquid state. Elongated tubes such as the reservoir tube 36 conventionally have a welded joint extending longitudinally for the length of the tube. In reservoir 36, this weld joint should be continuous and durable. In a reservoir bent or formed to fit the perimeter of an IG unit, the weld is positioned on a shoulder 42, 44 or outer parametric surface 46 of the reservoir 36. The alloy content of the metal and profile configuration should provide excellent bendability for forming consistent continuous corner sections, whereby the quantity of hermetically sealed reservoir joints is reduced. Bending can be accomplished by using conventional tube-bending equipment and known methodologies. In particular, forming equipment and methods should avoid compromise of the longitudinal weld joint. The fully shaped and bent reservoir tube 36 can be joined into a continuous loop reservoir by connecting butt ends. A variety of suitable internal joint connector devices are known and suitable for use in this application. Dependably leak-proof seals of the thin-wall spacer tube and reservoir at the butt joint can be fashioned using laser, radio frequency (RF), or induction welding processes, or, alternatively, by using an acrylic adhesive. Polyisobutylene or polyurethane sealants are known to produce leak proof seals.

Phase change material 38 is injected into the reservoir while in liquid state. Reservoir 36 is filled after being fully assembled and installed into an IG unit. One suitable method of injection is by drilling a port through the outer parametric surface 46 of the reservoir, injecting the liquid 38, and sealing the port. Filling the reservoir is best accomplished at the stage in manufacturing when the interlayer is being filled with a gas such as argon or krypton. Conventional practices utilize shoulder drills and known plugging devices to accomplish the gas filling steps. PCM charging of the spacer tube is best achieved at the gas-fill stage of IG unit assembly by utilizing a bottom fill pump, valving and process control layout. Final sealing of the injection port is accomplished using o-ring material and acrylic adhesive. Various edge seal materials may be used as a secondary seal of the PCM charging ports, butt joint and weld joint along the longitudinal axis of the spacer tube.

The operation of the insulated glass unit can be described for purposes of example with its interior panel facing a relatively warmer field and its exterior panel facing a relatively cooler field. Interlayer heat flux occurs in the presence of a temperature gradient between the interior and exterior sides of the IG unit. The direction of heat flow is from the relatively warmer field to the relatively cooler field. A steep temperature gradient will lead to a faster rate of heat flow. If a condition of temperature equilibrium is established, there is no temperature gradient and therefore no interlayer heat flow. This invention establishes a transient line of near temperature equilibrium adjacent to the edge-of-glass region of an insulated glazing unit. According to the preferred method of the invention, any heat gradient within the PCM filled parametric reservoir of an IG unit will be compressed or flattened along a line or arc of near temperature equilibrium, by compensating heat transfer at phase change within the PCM, thereby creating a transient barrier to heat flow.

EXAMPLE 1

For testing purposes, an insulated glazing unit, designated the Active Unit, was constructed of two layers of glass separated by a parametric reservoir and spacer filled with paraffinic oil as a phase change material (PCM). The PCM was chosen to have a crystallization temperature of about 40° F. (4.44° C.). The inner surface of the reservoir was coated with a desiccated matrix 47. The outer surface of the reservoir was coated with an edge seal. One side, arbitrarily designated the interior side, was exposed to a warm ambient temperature. The opposite side, arbitrarily designated the exterior side, was exposed to a variable colder temperatures. As a control, an otherwise structurally equivalent IG unit designated the Control Unit was constructed with the reservoir empty of phase change material.

A test fixture was employed to position the two insulated glazing unit test specimens at the opening of a Thermatron chamber where the fixture and test specimens form a common plane which effectively segregate and seal the chamber interior from ambient room temperature. A series of tests were conducted wherein one side of the Active Unit and Control Unit dual-pane glazing specimens were exposed to a relatively constant room temperature of about 70° F. (21.1° C.) and the opposite side of the glazing units were exposed to a programmed temperature profile controlled by the chamber. The temperature profile of the chamber comprised the following sequence; 1) reduce the temperature inside the chamber from 70° F. (21.1° C.) to about 0° F. (−17.8° C.) at the rate of about 6° F. (2.8° C.) per hour, 2) hold the chamber temperature at about 0° F. (−17.8° C.) for six hours, 3) increase the chamber temperature to about 60° F. (15.6° C.) at a rate of about 4° F. (1.88° C.) per hour and 4) terminate the test.

Temperatures from both IG units were simultaneously evaluated at several test points over time. The test points were (A) interior center of glass, (B) exterior center of glass, (C) interior sight line, and (D) exterior sight line. The measurements were taken at four elapsed times, with interior and exterior temperatures at the time of measurement recorded. Resulting data is shown in the following Tables 1–4. FIGS. 6–9 illustrate the corresponding physical state of the PCM in the Active IG unit and show the location of data points.

TABLE 1

Elapsed time 8.5 hours, interior 70° F. (21.1° C.), exterior 36.8° F. (2.7° C.)

|  | Active Unit |  | Control Unit |  |
|---|---|---|---|---|
| Interior Center of Glass Data | 62.7° | F. | 59.9° | F. |
| Point "A" | 17° | C. | 15.5° | C. |
| Exterior Center of Glass Data | 37.2° | F. | 39.9° | F. |
| Point "B" | 2.8° | C. | 4.3° | C. |
| Interior Sight Line Data | 53.6° | F. | 53.6° | F. |
| Point "C" | 12.0° | C. | 12.0° | C. |
| Exterior Sight Line Data | 45.3° | F. | 46.9° | F. |
| Point "D" | 7.3° | C. | 8.3° | C. |

TABLE 2

Elapsed time 12 hours, interior 74° F. (23.3° C.), exterior 19.1° F. (−7.16° C.)

|  | Active Unit |  | Control Unit |  |
|---|---|---|---|---|
| Interior Center of Glass Data | 58.7° | F. | 54.2° | F. |
| Point "A" | 14.8° | C. | 12.3° | C. |
| Exterior Center of Glass Data | 19.7° | F. | 23.2° | F. |
| Point "B" | −6.8° | C. | −4.8° | C. |
| Interior Sight Line Data | 47.1° | F. | 44.7° | F. |
| Point "C" | 8.4° | C. | 7.0° | C. |
| Exterior Sight Line Data | 33.7° | F. | 33.0° | F. |
| Point "D" | 0.9° | C. | 0.5° | C. |

TABLE 3

Elapsed time 13.5 hours, interior 73° F. (22.8° C.), exterior 10.2° F. (−12.1° C.)

|  | Active Unit |  | Control Unit |  |
|---|---|---|---|---|
| Interior Center of Glass Data | 57.0° | F. | 51.3° | F. |
| Point "A" | 13.8° | C. | 10.7° | C. |
| Exterior Center of Glass Data | 11.3° | F. | 15.2° | F. |
| Point "B" | −11.5° | C. | −9.3° | C. |
| Interior Sight Line Data | 44.9° | F. | 40.0° | F. |
| Point "C" | 7.1° | C. | 4.4° | C. |
| Exterior Sight Line Data | 29.2° | F. | 27.1° | F. |
| Point "D" | −1.5° | C. | −2.7° | C. |

TABLE 4

Elapsed time 14 hours, interior 70° F. (21.11° C.), exterior 7.0° F. (−13.89° C.)

|  | Active Unit |  | Control Unit |  |
|---|---|---|---|---|
| Interior Center of Glass Data | 56.1° | F. | 50.4° | F. |
| Point "A" | 13.4° | C. | 10.2° | C. |
| Exterior Center of Glass Data | 8.1° | F. | 12.2° | F. |
| Point "B" | −13.3° | C. | 11.0° | C. |
| Interior Sight Line Data | 39.8° | F. | 38.1° | F. |
| Point "C" | 4.3° | C. | 3.4° | C. |
| Exterior Sight Line Data | 23.2° | F. | 24.9° | F. |
| Point "D" | −4.8° | C. | −3.9° | C. |

Analysis of the data in Tables 1–4 and FIGS. 6–9 show a progression of the transient barrier in the singular test specimen. The phase change material within the reservoir is variously shown as being in solid phase 50 or liquid phase 52. An interface between the two phases is illustrated as a line or arc 54 that exists in three dimensions around the parametric reservoir as a convex plane of near temperature equilibrium. The plane 54 extends along the longitudinal axis of the reservoir within the PCM column, where no temperature gradient exists and no interlayer heat flow is on-going. For example in FIG. 7, at data point D the exterior glass surface temperature is 33.7° F. (0.95° C.), and the corresponding data point C on the interior side glass surface is 47.1° F. (8.39° C.). A clear temperature gradient exists between the respective interior and exterior glass surfaces. However, the temperature differential spans an approximately a 40° F. (4.44° C.) crystallization temperature of the preferred paraffinic PCM thereby causing; 1) a gradual release of latent heat and 2) a transient plane of temperature equilibrium at the interface of liquid/solid paraffinic oil. The arc of near temperature equilibrium and the plane of liquid/solid phase interface, of the PCM, are located where the balance of heat inputs from interior and exterior sources equals the approximate 40° F. (4.44° C.) crystallization temperature of the preferred paraffinic PCM.

Figure 7:
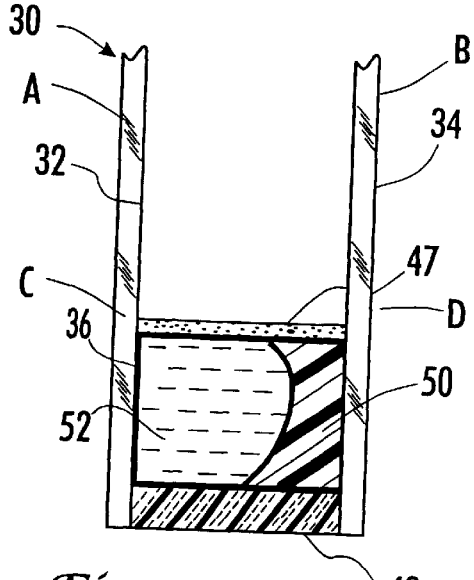
FIG. 7 is a view similar to FIG. 6, at a later time in the test.
Figure 8:
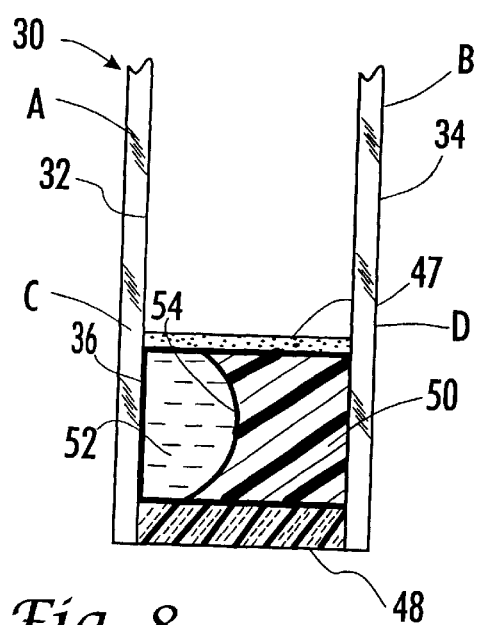
FIG. 8 is a view similar to FIG. 7, at a later time in the test.

Comparing FIGS. 7 and 8, the area of solid PCM in FIG. 8 is relatively larger. Arc 54 has moved in the 1½ hours that elapsed between the two measurement, and more of the PCM crystallized. The convex plane of near temperature equilibrium moved but remains as a transient barrier to heat flux. The exterior glass surface temperature at data point D is 29.2° F. (1.55° C.) and the corresponding data point C on the interior side glass surface is 44.9° F. (7.16° C.). The noted temperature differential continues to span an approximate 40° F. (4.44° C.) crystallization temperature of the paraffinic PCM, thereby sustaining a continuous release of latent heat and prolonging a transient plane of temperature equilibrium within the PCM.

Figure 9:
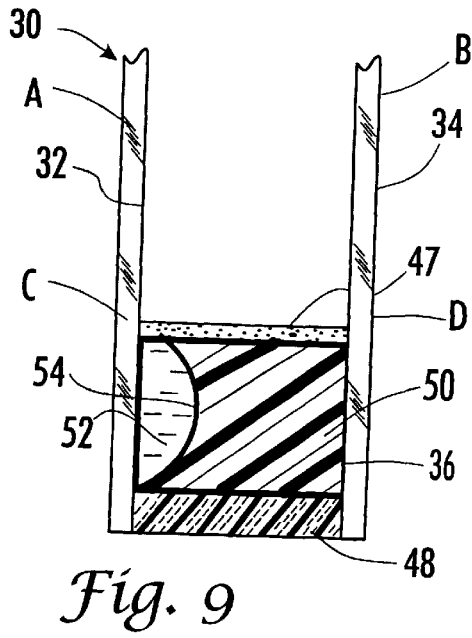
FIG. 9 is a view similar to FIG. 8, at a later time in the test.

FIG. 9 shows the results of a continuation of the test sequence for an additional one-half hour. The arc 54 has moved as the result of further crystallization of the PCM. Even after fourteen hours, any heat gradient within the PCM filled reservoir is compressed or flattened along the arc. Thus, there continues to be a longitudinal plane of near temperature equilibrium. The reservoir continues to compensate heat transfer through crystallization of the PCM, thereby continuing to create a transient barrier to heat flow at the interlayer.

Measurements of the Control Unit show corresponding results for a non-thermally active insulated glazing units of the test. Corresponding data point temperatures in Tables 1–4 show that the Active Unit prototype maintained warmer glass surface temperatures than the Control Unit prototype, both at sight-line and center-of-glass data points, over a five and one-half hour period of declining exterior temperatures.

Figure 10:
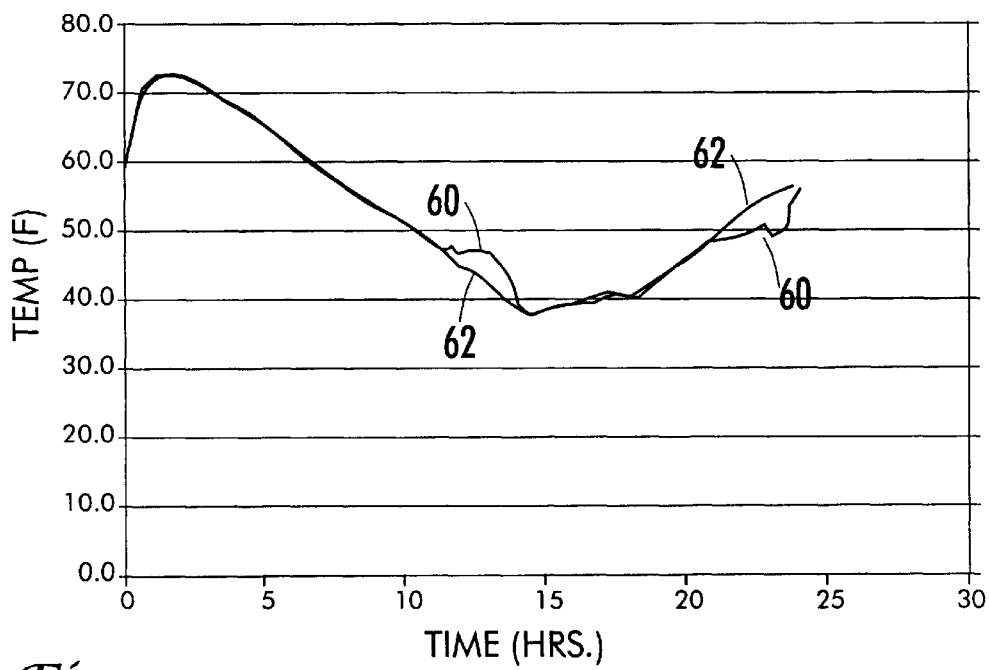
FIG. 10 is a graph comparing performance of an IG unit with PCM in a parametric spacer versus a similar unit without PCM in the spacer, under conditions of a colder exterior side.

FIG. 10 provides a further presentation for analysis of the data points collected in Table 1–4. The traces on the graph compare the interior glass surface temperatures of the Active Unit verses the Control Unit test specimens. The graph follows additional temperature data outside the realms where the PCM is active. The performance of the two test samples is similar in those realms. The similarity of both traces through much of the temperature profile sequence reflects only the insulative effect of conventional insulated glazing units. During much of the sequence, the corresponding interior glass surface temperatures of the Active trace were undifferentiated from the glass surface temperatures of the Control trace. Those similar data are reported only as they define the traces in substantially undifferentiated portions. Trace 60 tracks temperature versus time for the Active Unit, on the interior or constant temperature side, at side sight line data point C. Trace 62 tracks temperature versus time data for the Control Unit at data point C.

The graph shows that the Active Unit trace first diverges from Control Unit trace at approximately eleven hours elapsed time. The glass temperatures at sight line data point C for the interior panes each indicated about 48° F. (8.88° C.). Thereafter, as the programmed exterior temperature of the chamber continued to decline at the rate of about 6° F. (3.33° C.) per hour, the Active trace became substantially more level, changing at a lower rate. Over this same time range, trace 62 shows that the Control trace continued its decline on the temperature scale. Active trace 60 rejoins the Control trace 62 at approximately fourteen hours elapsed time. During the intervening three hours, the readings of data point C show that the edge-of-glass surface temperature of the interior pane of the Active Unit was substantially warmer, as compared to the corresponding data point on the Control Unit. This three hour divergence graphically illustrates the compressed or flattened arc of the longitudinal plane 54 of near temperature equilibrium. This compression or flattening is created by a compensating heat transfer upon crystallization of the PCM, forming a transient barrier to heat flow from the interior glass surface to the exterior glass surface at the interlayer.

The transient barrier to heat flow can be established at different points along a relevant temperature range by selecting other suitable PCMs. These can be paraffinic oils or other alkanes that offer higher or lower crystallization temperatures. In the Example 1 reported above, the preferred PCM has a crystallization temperature of about 40° F. (4.44° C.). This PCM is well suited to suppress interlayer heat flux in a climate where exterior winter temperatures fall between 20° F. (−6.67° C.) and 0° F. (−17.78° C.), which are a relatively common occurrence. A paraffinic PCM is available with a crystallization temperature of about 45° F. (7.22° C.) and might well be the preferred alternative in a more moderate climate. A third paraffinic PCM has a crystallization temperature of about 10° F. (−12.22° C.), which is a more suitable choice in extremely cold climates. Still other paraffinics have crystallization temperatures of about 37° F. (2.78° C.) and about 60° F. (15.55° C.).

At the far right in the graph of FIG. 10, at approximately twenty hours elapsed time, a second divergence occurs. The second divergence indicates that at data point C, the Active Unit is warming much more slowly with increasing temperatures, compared to the Control Unit as the chamber temperature profile rises toward 60° F. (15.55° C.). The second divergence begins at approximately 48° F. (8.89° C.), as did the initial divergence. However, the second temperature divergence is in a reverse direction. This reversibility indicates a compensating heat transfer upon fusion of the PCM. Despite the difference of phase change, the divergence indicates formation of a transient barrier to heat flow from the exterior glass surface to the interior glass surface at the interlayer. The divergence also shows that the Active Unit is being reset for a subsequent phase change iteration by crystallization when exterior temperature again decreases.

The reverse temperature divergence is important for a second reason. It serves to illustrate that fusion, which is a phase transition from solid to liquid, provides the capacity to suppress interlayer heat flux in insulated glazing units exposed to high exterior temperatures. Even in moderate climates, dual pane windows of conventional construction commonly have tinted or metal oxide coated glass surfaces. These tinted surfaces can absorb extreme amounts of heat. A conventional interlayer spacer bar efficiently transmits this heat to interior living and working quarters. This undesirable heat transfer can be offset by use of a sealed parametric metallic spacer tube filled with suitable PCMs for a high exterior temperature situation. Suitable paraffinic oils or alkanes should have a fusion temperature in the range from about 80° F. (26.66° C.) to about 100° F. (37.77° C.) and latent heat capacity of about 5200 Btu/cubic foot (194012000 joules/cubic meter). These PCMs are effective where temperature gradients are formed between the interior edge-of-glass surface at about 70° F. (21.11° C.) and exterior edge-of-glass surface at about 90° F. (32.22° C.) to 110° F. (43.33° C.). In these ranges, the fusion temperature of a preferred PCM falls between the respective interior and exterior glass temperatures. Upon fusion of the PCM, a compensating heat transfer will compress or flatten the temperature gradient along an arc or longitudinal plane of near temperature equilibrium. The use of such an appropriate PCM in a sealed parametric reservoir thereby creates a transient barrier to heat flow at the interlayer.

EXAMPLE 2

Figure 11:
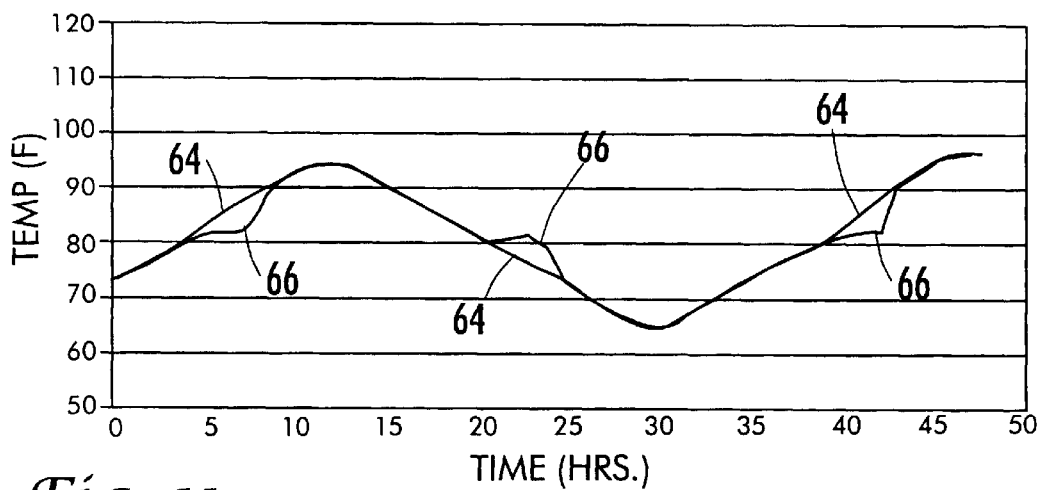
FIG. 11 is a graph similar to FIG. 10, showing the comparative performance octadecane versus a similar unit without PCM in the spacer, under conditions of a warmer exterior side.

A test fixture as described in Example 1 was used to show the performance of the IG unit with PCM when the exterior side is exposed to warm temperatures. Thus, n-octadecane was selected as the PCM in the Active Unit. Octadecane has a transition temperature of approximately 82° F. (27.77° C.). Both the Active Unit and a Control Unit employed ⅝ inch (15.87 mm) IG unit with an aluminum spacer. Test results over forty-seven hours are shown in FIG. 11. Temperature data points were measured at the side sight line on the constant temperature side of the IG unit.

Over the first ten hours, the Control trace 64 showed smooth increasing temperature from 73° F. (22.7° C.) to 94° F. (34.44° C.). The Active Unit trace increased smoothly to about 81° F. (27.22° C.) at four hours and then flattened, maintaining approximately 82° F. (27.77° C.) until seven hours. The Active Unit trace 66 then rose for about one hour before reaching the curve of the Control trace. Thus, the temperature gradient was flattened or reduced for a time span of three to four hours during a period of increasing exterior temperature.

Temperature declined from about eleven hours to about thirteen hours to about twenty-eight hours. During this period, the Control Unit showed a temperature trace 64 declining smoothly to about 65° F. (18.33° C.). Over the same period, the Active Unit showed a temperature trace 66 that flattened at twenty hours to a constant 82° F. (27.77° C.), which was maintained for about three hours and then declined for an additional hour before reaching the curve of Control Unit trace 64. Thus, with declining temperatures, the PCM again flattened or reduced the temperature gradient at the sight line of the Active Unit.

FIG. 11 shows that the cycle continues, as the Active Unit shows flattened temperature gradient on the next temperature upswing from thirty to forty-five hours. It can be concluded that a spacer filled with octadecane is effective choice to reduce the temperature gradient at the sight line of an IG unit facing external temperatures generally warmer than an air-conditioned interior habitation. Trace 66 demonstrates the advantage of reducing the temperature gradient; while trade 64 demonstrates the comparative performance of simply reducing conductivity of an IG unit.

From the results of Example 1 and Example 2, it can be projected that other applications would find similar advantages. For example, a refrigerated case in a supermarket could benefit from a triple-glazed IG unit. The interlayer closer to the refrigerated side could be equipped with a spacer filled with PCM having a transition temperature of about 42° F. (5.55° C.). The interlayer closer to the warm side could be equipped with a spacer filled with PCM having a transition temperature of about 68° F. (20.00° C.). This combination would flatten the temperature gradient significantly during defrost cycles of the refrigerated case, such as if the case temperature were raised to about 40° F. (4.44° C.) for a short interval.

A further scope of the invention is in application to divided-light window sash and simulated divided light IG units. True divided-light and simulated divided-light window sash are popularly associated with colonial style residential construction and are found in all areas of the United States. Divided-light sash refers to a central glazing area of a single window unit comprised of multiple lights or glazings. Relatively slender elements of sash rails and stiles extend vertically and horizontally across the visual area of a window in an opaque crosshatch pattern, partially obstructing the field of view.

As originally practiced, divided-light colonial style fenestration comprises six to twelve relatively small pieces of single pane glass, individually glazed in columns and rows defined by slender rail and stile extensions. Together, these formed a single, multi-panel window sash. With the advent of multi-pane IG units, manufacturing cost and on-site breakage and replacement considerations quickly drove window manufacturers to develop simulated divided-light IG units. These are formed of a single IG unit, absent the slender stile and rail extensions of true divided-light sash construction. However, the single IG unit contains an internal crosshatch pattern of opaque grille-work, also known as muntin-bar. The internal grille-work is positioned in the interlayer of the IG unit. This enables a cost-effective simulation of colonial fenestration.

As commonly practiced, the interlayer crosshatch pattern of opaque grille-work is decorative in nature and fabricated with vertical and horizontal members of this wall metallic hollow tubing, often of aluminum. The tubing is similar in form to perimeter spacer tubes of conventional IG construction as previously described. The metallic grille-work is positioned in close, unbonded contact with the interior and exterior glass panes of simulated divided-light IG units. This grille-work forms an efficient thermal bridge for interlayer heat flux across the central visual area of simulated divided-light IG units. Thus, the reservoir tubing of this invention can be employed in place of the traditional decorative grille-work of simulated divided-light windows.

The grille-work is further contained by mechanical means, such as an internal muntin-bar keeper at their juncture with the inner parametric surface of the preferred perimeter spacer 36. Additional mechanical means are employed at their intersections of the crosshatch pattern, such as by internal muntin-bar clips. Fabricated metallic components such as end plugs, well known in the industry, substantially seal the thin-walled tubing and central reservoir for containing a PCM. The mechanical constraints can be welded in place, forming leak-proof containers of the decorative grille-work. This adaptation of the grille-work enables an interruption of heat flux across the internal muntin-bars by the discontinuity of temperature gradients from compensating heat transfers emanating from the resident PCM to the metallic muntin-bars at fusion and crystallization. No sealants, moisture barriers or desiccants are required of muntin-bars, although a sealant is employed at the perimeter of the IG assembly.

Consequently, references to a receptacle or reservoir that is parametric of two glazed panes should be understood to include the synthetic parameter as created in a synthetic divided-light IG unit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. An improved glazing assembly formed of at least a first glazed pane and a juxtaposed second glazed pane, separated from each other by an interlayer containing a gas, and a seal between the panes near the edges of the panes, wherein the improvement comprises:

a thermally conductive, hermetically sealed receptacle positioned between the panes; and a phase change material contained within said receptacle, reversibly absorbing, storing, and releasing heat in response to temperature changes at least at one pane of the glazing assembly.

2. The glazing assembly of claim 1, wherein said receptacle is parametric of the first and second glazed panes.

3. The glazing assembly of claim 1, wherein said phase change material is selected from the group consisting of saturated hydrocarbons of the formula $C_nH_{2n+2}$ where n is an integer in the range from 12 through 24.

4. The glazing assembly of claim 1, wherein said phase change material is selected from the group consisting of straight-chain, normal paraffinic oils, alkanes, and combinations thereof.

5. The glazing assembly of claim 1, wherein:

said receptacle comprises a sealed reservoir of predetermined volume;

said phase change material contained within said reservoir comprises a paraffinic oil;

said reservoir is parametric of the first and second glazed panes; and the phase change material has an in-place density in the reservoir greater than 7.0 grams of paraffinic oil per cubic inch (114.8 grams per milliliter) volume of sealed parametric reservoir.

6. The glazing assembly of claim 5, wherein said sealed parametric reservoir has an enclosed profile area of no less than 0.06 square inch (38.7 square millimeter).

7. The glazing assembly of claim 1, wherein said phase change material is selected from the group having crystallization temperature in the range from about 10° F. (−12° C.) to about 45° F. (7.2° C.).

8. The glazing assembly of claim 1, wherein said phase change material is selected from the group having fusion temperature in the range from about 62° F. (16.67° C.) to about 98° F. (36.67° C.).

9. The glazing assembly of claim 1, wherein said phase change material is selected from the group having latent heat capacity in the range from about 4600 Btu/cubic foot (17162600 joules/cubic meter) to about 5200 Btu/cubic foot (194012000 joules/cubic meter).

10. A method of suppressing heat flux due to a temperature gradient applied between juxtaposed panels of a multi-panel structure, in which the multi-panel structure is formed of at least an inner panel and a juxtaposed outer panel, and in which the inner and outer panels are separated from each other by an interlayer, comprising:

providing a closed reservoir between the inner and outer panels and in communication with the interlayer;

providing within the closed reservoir a resident phase change material having a transition temperature within the temperature gradient; and suppressing interlayer heat flux by establishing a transient line of near temperature equilibrium within the resident phase change material of the reservoir.

11. The method of claim 10, wherein said step of providing a closed reservoir comprises providing a parametric reservoir with respect to the inner and outer panels.

12. The method of claim 10, wherein said step of providing a resident phase change material comprises providing a phase change material selected from the group consisting of saturated hydrocarbons of the formula $C_nH_{2n+2}$ where n is an integer in the range from 12 through 24.

13. The method of claim 10, wherein said step of providing a resident phase change material comprises providing a phase change material selected from the group consisting of straight-chain, normal paraffinic oils, alkanes, and combinations thereof.

14. The method of claim 10, wherein:

said step of providing a closed reservoir comprises providing a sealed reservoir of predetermined volume, located parametric of the inner and outer panes; and said step of providing a resident phase change material comprises providing a paraffinic oil having an in-place density in the reservoir greater than 7.0 grams of paraffinic oil per cubic inch (114.8 grams per milliliter) volume of sealed parametric reservoir.

15. The method of claim 14, wherein said step of providing a closed reservoir further comprises providing a sealed reservoir having an enclosed profile area of no less than 0.06 square inch (38.7 square millimeter).

16. The method of claim 10, wherein said step of providing a resident phase change material comprises providing a phase change material selected from the group having crystallization temperature in the range from about 10° F. (−12° C.) to about 45° F. (7.2° C.).

17. The method of claim 10, wherein said step of providing a resident phase change material comprises providing a phase change material selected from the group having fusion temperature in the range from about 62° F. (16.67° C.) to about 98° F. (36.67° C.).

18. The method of claim 10, wherein said step of providing a resident phase change material comprises providing a phase change material selected from the group having latent heat capacity in the range from about 4600 Btu/cubic foot (171626000 joules/cubic meter) to about 5200 Btu/cubic foot (194012000 joules/cubic meter).

* * * * *